W. HARRISON.
ILLUMINATION MEASURING DEVICE.
APPLICATION FILED NOV. 13, 1918.
1,331,062.
Patented Feb. 17, 1920.
2 SHEETS—SHEET 2.
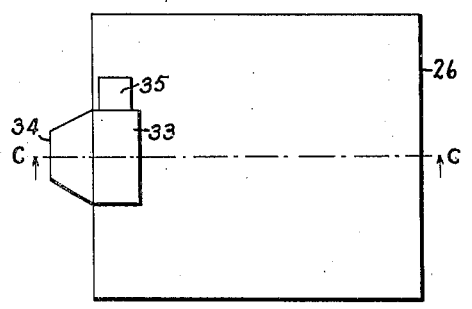
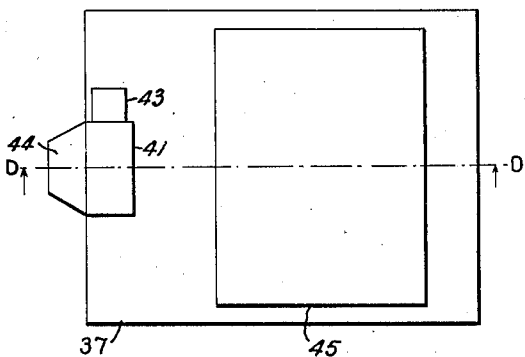
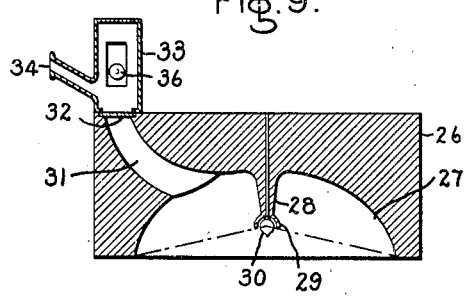
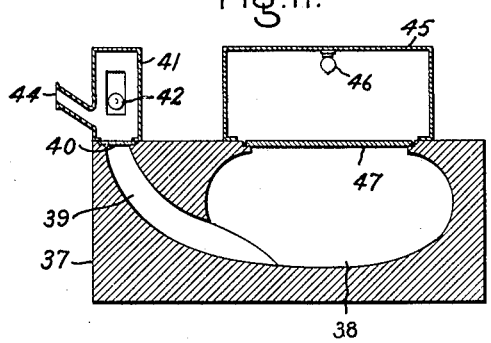
Inventor:
Ward Harrison,
by *Allen B. Davis*
His Attorney.

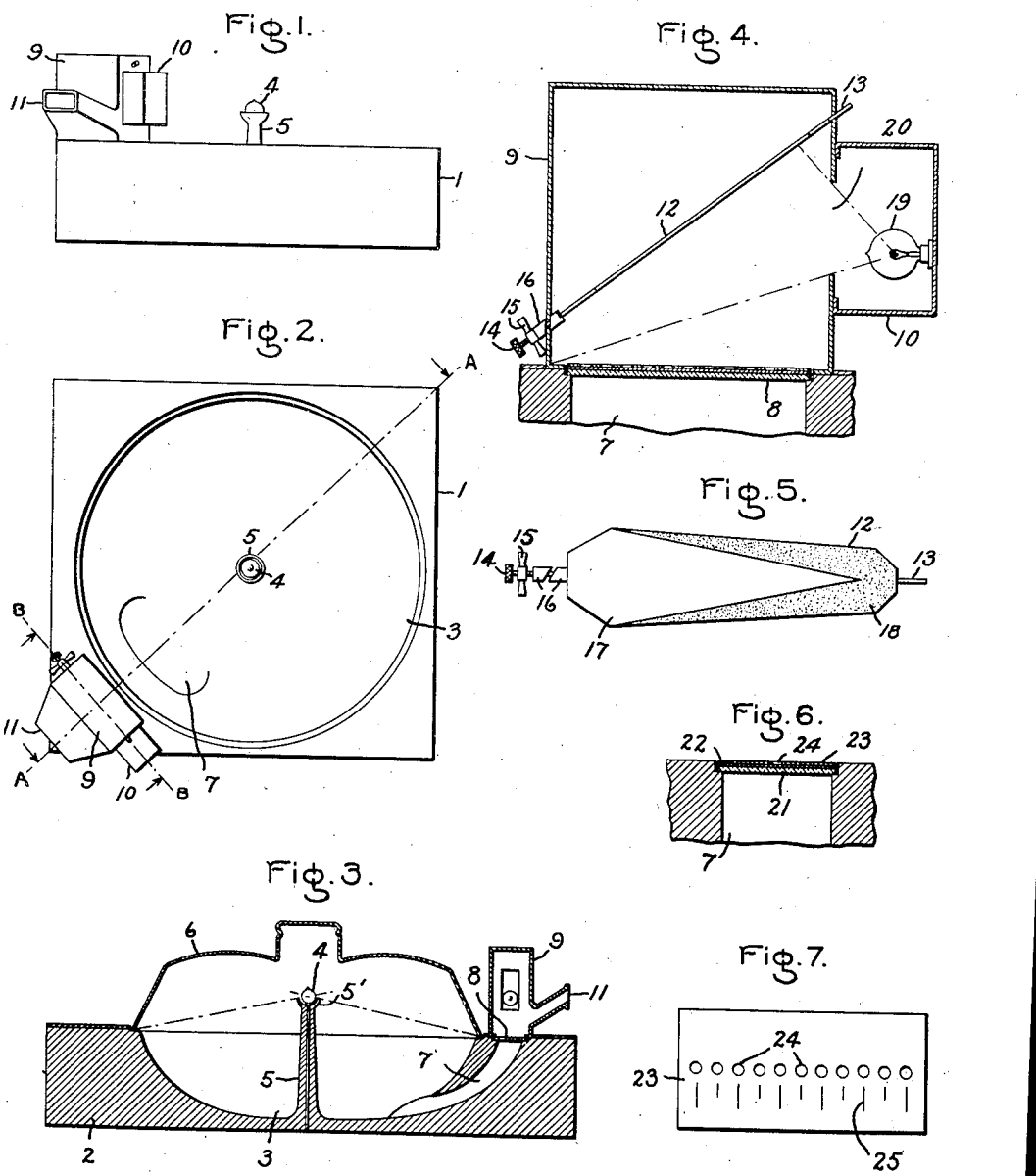

UNITED STATES PATENT OFFICE.

WARD HARRISON, OF CLEVELAND, OHIO, ASSIGNOR TO GENERAL ELECTRIC COMPANY, A CORPORATION OF NEW YORK.

ILLUMINATION-MEASURING DEVICE.

1,331,062.   Specification of Letters Patent.   Patented Feb. 17, 1920.

Application filed November 13, 1918. Serial No. 262,292.

*To all whom it may concern:*

Be it known that I, WARD HARRISON, a citizen of the United States, residing at Cleveland, county of Cuyahoga, State of Ohio, have invented certain new and useful Improvements in Illumination - Measuring Devices, of which the following is a specification.

My invention relates to illumination measuring devices and more particularly to devices for measuring the efficiency of light reflecting and transmitting media. The object of my invention is to provide a device by means of which such efficiency may be quickly and conveniently measured and which will therefore be useful in maintaining a higher standard of quality for reflectors, diffusers and other devices comprising reflecting and transmitting surfaces.

In the efficiency measuring device of my invention, I provide a chamber for the multiple reflection of the light transmitted or reflected by media of such characteristics from a light source. Leading from the reflection chamber, I provide a passage-way to an indicating member. Above the indicating member, I provide a housing containing any suitable means for giving a graded intensity of illumination on the upper surface of the indicating member from a second light source in the housing. The medium whose efficiency is to be measured is placed so as to cover the reflection chamber and in the case of a reflecting medium, the first light source is placed between the medium and the chamber but in the case of a transmitting medium, the transmitting medium is placed between the first light source and the reflection chamber. I prefer to place the two light sources in series in order to eliminate electrical measuring instruments.

Heretofore, for instance, whenever it has been desired to find the reflection factor of a reflector, it has been necessary to secure the distribution curve of the bare lamp for which the reflector was designed and also the distribution curve of the reflector with the lamp, which requires a total of thirty or more readings. After these two distribution curves have been secured, considerable time has been spent in mathematical calculation before the final result, the value of the reflection factor, has been obtained.

While it is possible to secure a standard distribution curve for a standard incandescent lamp, the distribution curve of the reflector and lamp must be secured for each reflector because reflecting surfaces of reflectors of identical contour may vary between wide limits. In securing a distribution curve, a certain amount of skill and considerable time are required. On ordinary inspection, the reflecting surfaces of two reflectors may appear no different in quality, but the results of photometric tests may show a difference of 10 or 20 per cent. in their reflection factors. It is, of course, impractical for the reflector manufacturers to check their products by obtaining distribution curves for each lot of reflectors which they sell, for the time and expense involved would be prohibitive. With my invention, it is possible to determine the reflection factor of a reflector directly in percentage in one reading within approximately 2 per cent. No special skill is required upon the part of the operator. Another incidental advantage possessed by the preferred form of my invention is that the use of voltmeters or other instruments is dispensed with. This arises from the fact that the two lamps which constitute the light sources in my device are operated in series and hence variations in current or voltage in the circuit affect both lamps to the same extent and any difference in illumination on one side of the indicating member is balanced by a corresponding difference on the other side.

In the accompanying drawings, Figure 1 is an elevation view of one form of my invention;

Fig. 2 is a top plan view of the same;

Fig. 3 is a sectional elevation on the section line A—A of Fig. 2;

Fig. 4 is a partial sectional elevation on an enlarged scale on the section line B—B of Fig. 2;

Fig. 5 is a bottom plan view of the reflecting louver;

Fig. 6 is an enlarged sectional elevation showing the indicating member and adjacent parts;

Fig. 7 is a top plan view of the indicating member;

Fig. 8 is a top plan view of another form of my invention;

Fig. 9 is a sectional elevation on the section line C—C of Fig. 8;

Fig. 10 is a top plan view of a form of my invention used for determining the efficiency of transmitting surfaces;

Fig. 11 is a sectional elevation on the section line D—D of Fig. 10.

Referring now to Figs. 1, 2 and 3, it will be seen that in this illustrated form, my invention consists of a container 1 filled with plaster of Paris 2 which has been formed into a concave basin 3 in the center of which a lamp 4 is supported by a plaster of Paris standard 5 so located that when a reflector 6 (shown in Fig. 3 only) is placed over the basin 3 the light source will be in the same position with respect to the reflector 6 as is a lamp when the reflector is in ordinary use. The lamp 4 is partly surrounded by a plaster of Paris shield 5' forming the upper end of the supporting standard 5. The shield 5' cuts off all direct light from the lamp 4 which would otherwise fall on the reflecting surface of the basin 3, but permits direct rays to reach every point on the inner surface of the reflector 6. A passage 7 leads from the basin 3 up to the indicating member 8 which is covered by the housing 9 to which is attached a lamp box 10 and a sighting passage 11 open at the upper end and slanted so that the eye may see the indicating member 8.

Referring now to Figs. 4, 5, 6 and 7, the housing 9 contains a louver 12 mounted upon a rod 13, one end of which passes through the housing 9 above the lamp box 10 and the other, near the bottom of the opposite side. The lower end of the rod 13 is fastened to a knurled disk 14 which is used to rotate the louver 12. The portion of the rod 13 between the disk 14 and the louver 12 is threaded and fitted with a wing nut 15 and suitable washers 16. A wedge-shaped portion 17 of the surface of the louver 12 is white, the remainder 18 being black. The louver 12 is chamfered at the corners in order to permit it to be rotated about the rod 13 in the housing 9.

The aperture 20 between the housing 9 and the lamp box 10 is so made and placed with respect to the lamp 19 that direct light from this source falls upon the louver 12 at a point at least as high as the apex of the wedge-shaped white portion 17 but not upon the indicating member 8. The indicating member 8, which is not *per se* my invention but has been used heretofore, consists of a rectangular piece of clear glass 21 on the upper surface of which is placed a similar piece of thin translucent paper 22 covered by a similar piece of opaque paper 23 pierced at regular and frequent intervals along its center and throughout its length by small round holes 24. A scale 25 is laid out on the opaque paper 23 parallel to the holes 24.

When a reflector 6 is placed over the basin 3, the light from the lamp 4 first strikes the reflecting surface and is directed down to the surface of the basin and back again many times. A portion of the light, however, finds its way through the passage 7 to the under side of the indicating member 8 and illuminates it uniformly to an intensity which is dependent on the amount of light directed downward by the reflector. The upper side of the indicating member 8 is illuminated to a graded intensity by the light directed downward by the wedge-shaped white portion 17 of the louver 12 from the lamp 19. At the point on the opaque paper 23 where the value of the graded intensity equals the value of the illumination in the passage 7, the hole 24 will seem to disappear. On either side of this hole 24, the other holes will appear brighter or darker respectively. The reading on the scale 25 corresponding to the hole 24 is an indication of the reflection factor of the reflector 6. By rotating the louver 12 by means of the knurled disk 14, the disappearing hole, that is, the point of balanced illumination, may be brought to any position along the scale 25. The louver 12 may then be locked in position by tightening the wing nut 15.

The simplest use of my device is to determine whether one reflector of unknown quality is better or poorer than a standard reflector, that is, one whose reflection factor has been determined from its distribution curve. The standard reflector is placed in position on my device, and, by viewing the hole in the opaque indicating member 8, the light intensity on the under paper where the light intensity on the upper side is equal to that on the upper side is determined and used as a reference point. If, when another reflector is placed on my device, the new scale reading is the same as the reference point, the reflection factor of the second reflector is the same as that of the standard. If the scale reading is higher or lower than the reference point, it is an indication that the reflection factor is respectively higher or lower.

However, the scale 25 may be calibrated to give the reflection factors directly in per cent. For this work it is necessary to use at least two standard reflectors whose reflection factors vary over a considerable range. By taking readings on the scale 25 for each reflector and plotting these readings against the respective known reflection factors in per cent., the reflection factor of an unknown reflector may be determined by taking a scale reading and finding the corresponding reflection factor in per cent. from the curve. The indicating device may then be removed and the scale of corresponding reflection factors in per cent. be superimposed upon the scale 25. Then any reflector may be placed over the basin 3 and its reflection factor in per cent. may be read di rectly from the superimposed scale. For such measurements, my device is accurate to within about 2 per cent. and this accuracy is due to the multiple reflections within the device which tend to magnify (or raise to a higher power) any difference in the reflection factors.

Although in the preceding description of my invention I have said that the basin 3 and supporting standard 5 were made of plaster of Paris, they may be made of metal or other material finished in white or a similarly good reflecting surface. Although, in the housing 9 I have used a louver 12 with a white wedge-shaped portion 17 and a dark portion 18, any device which will give a graded intensity of illumination upon the upper surface of the indicating member 8 may be used.

In Figs. 8 and 9 is shown another form of my invention which may be used to determine the reflection factor of flat surfaces. The container 26 has a shallow dome 27 corresponding to the basin 3 of Fig. 3. The supporting standard 28 with lamp shield 29 carries a lamp 30. A passage-way 31 leads from the dome 27 to the indicating member 32. The housing 33 contains a louver (not shown) to secure a graded intensity on the upper side of indicating member 32 and has attached to it the sighting passage 34 and lamp box 35 containing the lamp 36 electrically connected in series with the lamp 30. In operation the indicating member 32 is calibrated through the use of at least two flat reflecting surfaces placed under the dome 27.

In Figs. 10 and 11, I have shown a form of my invention which may be used for determining the efficiency of a transmitting medium. The container 37 has a shallow basin 38 with a passage 39 leading to the indicating member 40. The housing 41 corresponds with the housing 9 of Fig. 3 and contains a louver (not shown) to secure a graded intensity on the upper side of the indicating member 40 from the lamp 42 contained in the lamp box 43 attached to the housing 41. A sighting passage 44 is also provided. Over the basin 38 is placed a lamp box 45 with a lamp 46 electrically connected in series with the lamp 42. The inner surface of the lamp box 45 is painted black. The transmitting medium 47 is placed between the lamp box 45 and the basin 38. In operation, the indicating member 40 is calibrated through the use of at least two transmitting media placed between the lamp box 45 and the basin 38.

What I claim as new and desire to secure by Letters Patent of the United States, is,—

1. A device for measuring the efficiency of a light reflecting or transmitting medium comprising a light source mounted to illuminate said medium, a reflecting means disposed opposite to said medium and forming therewith a chamber, an indicating medium, a passage communicating with said chamber and leading to said indicating medium and means for comparing the illumination cast upon said indicating medium with that of a standard.

2. A device for measuring reflecting efficiency comprising a support for a reflecting medium, a reflecting means disposed opposite thereto and forming a chamber therewith, a light source in said chamber, an indicating medium, a passage communicating with said chamber and leading to said indicating medium and means for comparing the illumination cast upon said indicating medium with that of a standard.

3. A device for measuring the efficiency of a light transmitting or reflecting medium comprising a light source disposed so as to illuminate said medium, a chamber provided with means for producing an even intensity of illumination therein disposed so as to receive illumination from said medium, an indicating medium mounted to receive illumination from said chamber and means for comparing said illumination with that of a standard.

4. A device for measuring the efficiency of a light transmitting or reflecting medium comprising a light source disposed so as to illuminate said medium, a reflecting means disposed relative to said medium so as to form therewith a chamber in which the illumination from said medium is reflected repeatedly back and forth to produce an even illumination therein, an indicating medium mounted to receive illumination from said chamber and means for comparing said illumination with that of a standard.

5. A device for measuring the efficiency of a light transmitting or reflecting medium comprising a light source disposed so as to illuminate said medium, a chamber provided with means for producing an even intensity of illumination therein disposed so as to receive illumination from said medium, an indicating device comprising a series of alternate opaque and translucent portions mounted to receive illumination on one side thereof from said chamber, a second light source disposed on the opposite side of said indicating device and means for reflecting light of a graded intensity from said second source upon said indicating device.

6. A device for measuring the efficiency of a light transmitting or reflecting medium comprising a light source disposed so as to illuminate said medium, reflecting means disposed relative to said medium so as to form therewith a chamber in which the illumination from said medium is reflected repeatedly back and forth to produce an even illumination therein, an indicating device comprising a series of alternate opaque and translucent portions mounted to receive illumination on one side thereof from said chamber, a second light source disposed on the opposite side of said indicating device and means for reflecting light of a graded intensity from said second source upon said indicating device.

7. A device for measuring the efficiency of a light reflecting or transmitting medium comprising a light source mounted to illuminate said medium, reflecting means disposed opposite to said reflector and forming therewith a chamber, an indicating device, a passage communicating with said chamber and leading to said indicating device comprising alternate opaque and translucent areas, a second light source disposed on the side of said indicating device opposite from said passage and means for directing light from said second source of a graded intensity upon said indicating device.

8. A device for measuring reflecting efficiency comprising a support for a reflecting medium, a reflecting means disposed opposite thereto and forming a chamber therewith, a light source in said chamber, an indicating device, a passage communicating with said chamber and leading to said indicating device comprising alternate opaque and translucent areas, a second light source disposed on the side of said indicating device opposite to said passage and means for directing light from said second source of a graded intensity upon said indicating device.

In witness whereof, I have hereunto set my hand this eighth day of November, 1918.

WARD HARRISON.